United States Patent Office 2,707,206

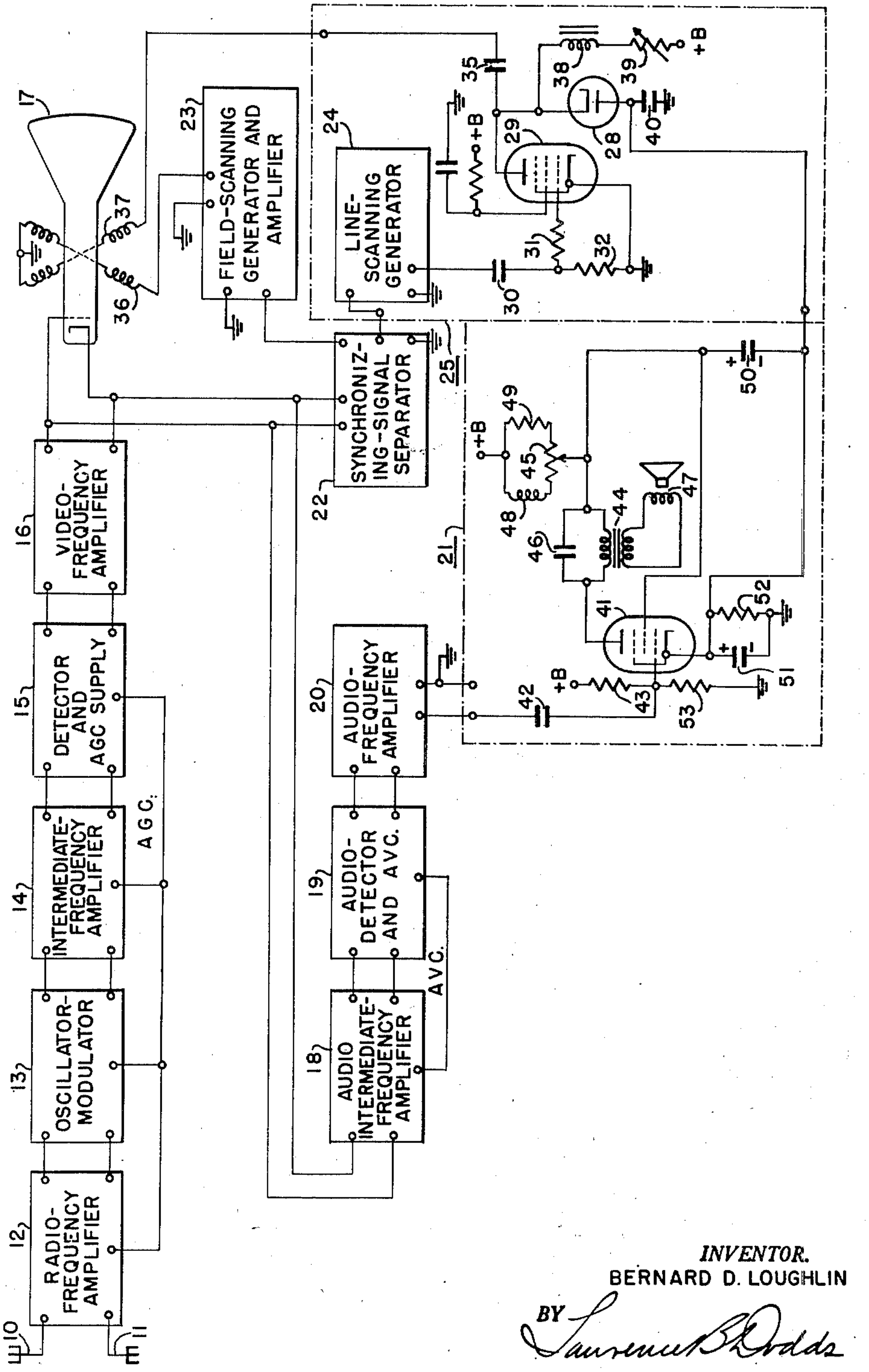
INVENTOR.
BERNARD D. LOUGHLIN
BY Laurence B. Dodds
ATTORNEY

Patented Apr. 26, 1955

2,707,206

ELECTROMAGNETIC BEAM-DEFLECTION SYSTEM FOR TELEVISION RECEIVER

Bernard D. Loughlin, Lynbrook, N. Y., assignor to Hazeltine Research, Inc., Chicago, Ill., a corporation of Illinois Application December 8, 1950, Serial No. 199,733

9 Claims. (Cl. 178—5.8)

*General*

The present invention relates generally to an electromagnetic beam-deflection system for television receivers and, particularly to such systems for inexpensive television receivers that more efficiently utilize the power available from the receiver power supply.

In accordance with present-day television practice, a transmitted television signal comprises a carrier-wave signal modulated during recurrent periods with video-frequency and steady-state components representative of light variations in an image being viewed and control signals for maintaining the transmitter and receiver systems in synchronism. A carrier wave modulated by audio-frequency signals also is transmitted adjacent the above-mentioned wave within the same wide radio-frequency band. These carrier waves are intercepted by a television receiver wherein the various modulation signals of the carrier waves are detected and utilized in the audio-frequeny and video-frequency circuits.

Due to the complexity of the received signal, the circuits required to perform the functions necessary in a television receiver are numerous. In particular, many vacuum tubes and associated circuit components are required to separate the complex signal into its components and to utilize these components in the desired manner. The presence of such a great number of tubes places a heavy demand on a power-supply or potential-supply system for the circuits involved and normally the power-supply system provided is one of relatively large capacity utilizing expensive transformers. These power requirements often involve a maximum average current which exceeds the rating of a conventional rectifier tube, thereby necessitating the use of at least two rectifier circuits.

When cost and size do not control the design of a television receiver, the use of extra rectifier circuits may not be objectionable. When designing an inexpensive and compact television receiver, however, the addition of any extra tubes or any extra circuit components is to be avoided whenever possible without undue sacrifice in performance or without undue increase in the complexity of the circuits.

In minimizing the number of rectifier devices and associated circuit elements, and in utilizing the available power in the most efficient manner, the circuit arrangement involved should not produce high direct-current voltages between the cathode and heater elements of any tube and should be of such a type as to permit separate circuits for the focus and horizontal width controls, thereby preventing interaction of the voltages in these circuits.

It is an object of the present invention to provide a new and improved electromagnetic beam-deflection system for a television receiver which utilizes the available power in a highly efficient manner.

It is an additional object of the present invention to provide a new and improved electromagnetic beam-deflection system for a television receiver which develops from a source of voltage voltages of different values without dissipating energy.

It is also an object of this invention therefore to provide a new and improved electromagnetic beam-deflection system for a television receiver which utilizes a minimum of rectifier devices and associated circuit elements.

It is another object of the invention to provide a new and improved electromagnetic beam-deflection system for a television receiver which utilizes a minimum of rectifier devices without producing high direct-current voltages between the cathode and heater elements of any tube.

A still further object of the invention is to provide a new and improved electromagnetic beam-deflection system for a television receiver which has the focus and horizontal width controls of the receiver so arranged as to prevent interaction of the voltages thereof.

In accordance with the present invention, an electromagnetic beam-deflection system for a television receiver comprising an electron-discharge apparatus, a load circuit coupled to this apparatus including an inductor, and means coupled to the apparatus for applying thereto a periodic potential for developing a current of saw-tooth wave form in the inductor. The beam-deflection system also comprises a signal repeater stage for translating at least a component of a composite television signal having picture and sound components and including a cathode impedance responsive to the current in the stage for developing a potential across the impedance. Finally, the beam-deflection system comprises a unidirectionally conductive device having one electrode coupled to the apparatus and the load circuit and another electrode conductively connected to the aforesaid cathode impedance so that at least a portion of the current flowing in the stage flows through the device and at least a portion of the potential developed in the cathode impedance is effective to so bias the other electrode of the device as to cause the device to be normally conductive during at least a fraction of the trace period of the saw-tooth current.

For a better understanding of the present invention, together with other and further objects thereof, reference is had to the following description taken in connection with the accompanying drawing, and its scope will be pointed out in the appended claims.

In the drawing, the figure is a circuit diagram, partly schematic, of a television receiver including an electromagnetic beam-deflection system in accordance with a particular form of the present invention.

Referring now to the drawing, the television receiver there represented is of the superheterodyne type and includes an antenna system 10, 11 coupled to a radio-frequency amplifier 12 of one or more stages. There are coupled to the latter unit, in cascade and in the order named, an oscillator-modulator 13, an intermediate-frequency amplifier 14 of one or more stages, a detector and automatic-gain-control supply circuit 15, a video-frequency amplifier 16 of one or more stages, and an image reproducer 17 of the cathode-ray-tube type. Conventional beam-deflecting windings 36 and 37 are associated with the tube. There are also coupled to the video-frequency amplifier 16, in cascade and in the order named, an audio intermediate-frequency amplifier 18 of one or more stages, an audio detector and automatic-volume-control or A. V. C. circuit 19, an audio-frequency amplifier 20 of one or more stages, and an output unit 21 comprising an audio-frequency output amplifier and sound reproducer.

There is also coupled to the video-frequency amplifier 16 a synchronizing-signal separator 22 having output circuits connected with a field-scanning generator and amplifier 23 and a line-scanning generator 24, the latter unit being part of a means 25 for generating scanning potentials. The output circuit of the unit 23 is connected to the beam-deflecting winding 36 in the image reproducer 17. The output circuit of the line-scanning generator 24 is connected through a line-scanning-amplifier circuit, also part of unit 25, to the beam-deflecting winding 37 in the image reproducer 17.

The A. G. C. output of the unit 15 is applied to the input circuits of one or more of the tubes of the radio-frequency amplifier 12, the oscillator-modulator 13 and the intermediate-frequency amplifier 14 in a well-known manner. Similarly, the A. V. C. output of the unit 19 is applied to the input circuit of the audio intermediate-frequency amplifier 18 in a well-known manner.

It will be understood that the various units thus far described, with the exception of the output unit 21 and the means 25 for generating scanning potentials may be of conventional construction and design, the details of such units being well known in the art and rendering a further description thereof unnecessary. The units 21 and 25 comprise an electromagnetic beam-deflection system for a television receiver in accordance with the present invention and will be described in detail hereinafter.

Considering briefly the operation of the receiver as a whole, but assuming for the moment that the units 21 and 25 perform conventional functions, a desired composite television signal comprising audio-signal and video-signal modulated carrier waves is intercepted by the antenna system 10, 11. The signal is selected and amplified in the radio-frequency amplifier 12 and applied to the oscillator-modulator 13 wherein it is converted to an intermediate-frequency signal. The intermediate-frequency signal is selectively amplified in the amplifier 14 and supplied to the detector 15 where its modulation components are derived. These components include audio-frequency and video-frequency as well as synchronizing-signal components and are further amplified in the video-frequency amplifier 16. The video-frequency components are applied to a control electrode of the image reproducer 17 to modulate the intensity of the electron beam thereof in accordance with that of the video-frequency components. The synchronizing-signal components of the received signal are separated from the video-frequency components in the separator 22 and are used to synchronize the operation of the field-scanning and line-scanning generators in the units 23 and 24, respectively. These generators supply scanning signals of saw-tooth wave form which are properly synchronized with reference to the received television signal and applied to the deflecting windings 36, 37 of the image reproducer 17 through their respective scanning amplifiers, thereby to deflect the cathode-ray beam in the image reproducer 17 in two directions normal to each other to reproduce the received image.

The automatic-gain-control or A. G. C. signal derived in the unit 15 is effective to control the amplification of the units 12, 13 and 14 to maintain the signal input to the detector 15 and to the video-frequency amplifier 16 within a relatively narrow range for a wide range of received signal intensities.

In the detector 15, the audio intermediate-frequency wave signal beats with the video intermediate-frequency wave signal to produce a difference signal of approximately 4.5 megacycles which is then applied to audio intermediate-frequency amplifier 18 after translation through amplifier 16. The audio intermediate-frequency signal is amplified in amplifier 18 and delivered to the audio detector and A. V. C. unit 19. The audio-signal modulation components are derived in the unit 19, amplified in the amplifier 20 and further amplified and reproduced in the unit 21. The A. V. C. signal derived in the unit 19 is effective to control the amplification of the intermediate-frequency amplifier 18 to maintain the signal input to the detector 19, and to subsequent amplifiers, within a relatively narrow range for a wide range of sound-signal intensities.

*Description of the electromagnetic beam-deflection system*

Referring now more particularly to the electromagnetic beam-deflection system of the invention, including units 21 and 25, the circuit comprises means for generating scanning potentials comprising unit 25 including an electron-discharge apparatus comprising a vacuum tube 29, preferably of the pentode type having a high amplification factor, and the line-scanning generator 24. The output circuit of the line-scanning generator 24 is coupled through a coupling condenser 30 and a resistor 31 to the control electrode of the tube 29 a grid-leak resistor 32 also being connected thereto. The anode-cathode circuit of the tube 29 is coupled through a condenser 35 to the beam-deflecting winding 37. The latter anode-cathode circuit, the condenser 35, and the terminals connecting these units to the winding 37 comprise a load circuit coupled to the apparatus including the tube 29. The terminal of the condenser 35 remote from the anode and the ground terminal coupled to the cathode comprise means in such load circuit for coupling an inductor, specifically the winding 37, to the load circuit. Such load circuit with the winding 37 operatively coupled thereto is primarily inductance.

The beam-deflection system also comprises means coupled to said apparatus for applying thereto a periodic potential for developing a current of saw-tooth wave form in the inductor when it is coupled to the load circuit. The latter means comprises the generator 24.

The beam-deflection system also comprises a unidirectionally conductive device, for example the diode 28, including a pair of electrodes one of which is coupled to the apparatus and the load circuit and the other of which is so biased as to cause the device 28 to be normally conductive during at least a fraction of the trace period of the aforementioned saw-tooth current. The diode 28 is also coupled across the beam-deflecting winding 37 through the condenser 35 and a condenser 40, the diode 28 and the condenser 40 being effectively in parallel with the tube 29. The cathode of the diode 28 and the anode of the tube 29 are connected through an inductor 38 and a width-control adjustable resistor 39 to a source of potential +B. It is thus seen that the diode 28 is connected to act as the well-known efficiency diode across the beam-deflecting winding 37.

The electromagnetic beam-deflection system also comprises the unit 21 including a signal repeater stage for translating at least a component of a composite television signal having both picture and sound components, in particular the audio-frequency portion of that signal. The unit 21 includes a vacuum tube 41, preferably of the pentode type, having its control electrode connected through a coupling condenser 42 to the output circuit of the audio-frequency amplifier 20. The control electrode of the tube 41 is also connected to a point of positive potential on a voltage divider comprising a resistor 43 and a resistor 53 connected in series between a source of potential +B and ground. The anode-cathode circuit of the tube 41 includes the primary winding of an output transformer 44 and a filter condenser 50. A filter condenser 46 is connected across the primary winding of the transformer 44 while a signal reproducer 47 is connected across the secondary winding thereof. Anode potential for the tube 41 is supplied from a source +B through an anode-impedance network comprising a high-impedance voltage-divider resistor 45 connected across a focus coil or focusing winding 48 through a resistor 49. The cathode circuit of the tube 41 includes a cathode-impedance network comprising a condenser 51 and a resistor 52 in parallel. The cathode of the tube 41 is conductively connected to the anode of the diode 28, and diode 28 and the condenser 40 in combination with the network 51, 52 comprising means for developing a bias potential for the tube 41 of the unit 21 and an operating potential for the anode of the diode 28.

*Operation of the television receiver circuit*

The general operation of the unit 21 is conventional, although some of the circuit connections, as have been described, are not conventional. Similarly, the general operation of the line-scanning circuit including amplifier 29, scanning winding 37 and efficiency diode 28 is conventional, although some of the circuit connections are also unconventional.

The tube 41 and its associated circuits act as a conventional output amplifier circuit to apply the audio signal amplified therein through the transformer 44 to the device 47 for sound reproduction. The cathode of the tube 41 is normally biased by the network 51, 52 but the connection of the cathode of the tube 41 to the anode of the efficiency diode 28 modifies this biasing action causing the tube 41 to draw slightly more current than when a conventional biasing circuit is employed.

The line-scanning signal frequency generated in the unit 24 is applied to the control electrode of the line-scanning signal amplifier 29 through the coupling condenser 30 and the resistor 31. During a portion of the trace portion of the scanning signal, current flows through the amplifier tube 29 to generate in the deflection winding 37 a line-trace signal. To increase the amplitude of the line-trace or saw-tooth current without materially increasing the power consumption of the scanning circuits, efficiency diode 28 is provided. This diode is associated with the load circuit including deflection winding 37 essentially to stabilize the saw-tooth signal by stabilizing the voltage across the deflection winding during the trace period and to improve the efficiency of the scanning circuits. During the initial portion of the trace period of the saw-tooth signal, when the current flow through pentode 29 is at cutoff due to the negative bias voltage developed on the control electrode thereof, the low resistance of the diode 28 is effective substantially to increase the flow of current through the winding 37 by permitting a large amount of the current then flowing in the circuit to flow through the diode. As the output current of pentode 29 builds up to its maximum value the diode continues to conduct decreasing amounts of current. At the latter portion of the build-up of the current in the pentode 29, the current through the diode is supplied solely by the pentode. By operating in this manner the diode continuously acts during trace as a low impedance across the winding 37, drawing varied amounts of current from the winding 37 and the pentode 29 and thereby increasing the current flow in the winding 37 during portions of the scanning cycle, while maintaining linear and improved horizontal scanning.

During the trace period of the scanning cycle, the voltage present on the anode of the tube 29 and the cathode of the diode 28 is normally of the order of 35–50 volts. Therefore, in order that current will flow through the diode 28 during this period, a positive bias or operating voltage of the same order of potential must be applied to the anode of the diode. Normally, such a voltage would be obtained directly from the receiver power supply through the means of a bleeder or voltage divider circuit. If such a voltage supply arrangement is used, since the diode normally draws the largest amount of current in the scanning circuit, there would be a large power loss in the bleeder and the benefits of the efficiency diode would be substantially nullified. Also in order that the potential on the anode of the diode remain constant, it is not desirable to utilize the width control 39 as a dropping resistor, since any adjustments in width then would affect the value of the voltage on the anode of the diode 28. In addition, since the current through the diode exceeds that normally flowing through the width control, some undesired heat losses would be developed. It is preferable to obtain the operating potential for the anode of the diode from a source of substantially constant potential and from a source where little or no waste in energy will occur. The cathode-follower circuit of the tube 41 provides such a source. The resistor 52 and the condensers 40 and 51 are proportioned in accordance with the current flowing through the diode 28 during the trace period and the current flowing through the tube 41 to develop the desired bias for the tube 41 and the desired operating voltage for the anode of the diode 28. In this manner no extra power is required from the power supply of the receiver to maintain the bias on the cathode of tube 41 or the operating voltage on the anode of diode 28 and the power available in the power supply is utilized in a highly efficient manner.

The condenser 50 is coupled between the anode and cathode of tube 41 to stabilize the bias potential applied to the cathode of the tube 41 so that it is free from fluctuations produced by strong audio signals. In addition, the anode-impedance network including the focus coil 48 is coupled in circuit with the anode of the tube 41 and the source of potential +B to effect a high-impedance load in the +B supply circuit capable, in conjunction with the condenser 50, of damping out effects of any excessive audio signals that might introduce such fluctuations in the cathode network.

While applicant does not intend to be limited to any particular circuit values in the embodiment of the invention described, there follows a set of circuit values which have been found to be particularly suitable for a television receiver circuit of the type represented in the drawing.

| | |
|---|---|
| Tube **41** | Type 50B5. |
| Tube **28** | Type 6X4. |
| Tube **29** | Type 7A5. |
| Resistor **52** | 4700 ohms. |
| Condenser **40** | 0.2 microfarad. |
| Condenser **50** | 8 microfarads. |
| Condenser **51** | 50 microfarads. |
| Potential +B | 230 volts. |

All other circuit values may be of any conventional size.

Although the present invention has been described with relation to the combination of an efficiency diode and the normal biasing means of a vacuum-tube amplifier as a means for deriving a potential which may be utilized for the dual purpose of providing at least a portion of the biasing voltage for the amplifier and providing an operating potential for the diode, the teachings of the invention may be utilized in other circuit arrangements. In particular, the teachings of the invention apply equally well to an efficiency or similar type circuit using other than diodes.

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. An electromagnetic beam-deflection system for a television receiver comprising: an electron-discharge apparatus; a load circuit coupled to said apparatus and including an inductor; means coupled to said apparatus for applying thereto a periodic potential for developing a current of saw-tooth wave form in said inductor; a signal repeater stage for translating at least a component of a composite television signal having picture and sound components and including a cathode impedance responsive to the current in said stage for developing a potential across said impedance; and a unidirectionally conductive device having one electrode coupled to said apparatus and said load circuit and another electrode conductively connected to said cathode impedance so that at least a portion of the current flowing in said stage flows through said device and at least a portion of said potential developed in said cathode impedance is effective to so bias said other electrode of said device as to cause said device to be normally conductive during at least a fraction of the trace period of said saw-tooth current.

2. An electromagnetic beam-deflection system for a television receiver comprising: an electron-discharge apparatus; a load circuit coupled to said apparatus and including an inductor; means coupled to said apparatus for applying thereto a periodic potential for developing a current of saw-tooth wave form in said inductor; a signal repeater stage for translating at least a component of a composite television signal having picture and sound components and including a cathode impedance responsive to the current in said stage for developing a potential across said impedance; and a damping diode having a cathode coupled to said apparatus and said load circuit and an anode conductively connected to said cathode impedance so that at least a portion of the current flowing in said stage flows through said diode and at least a portion of said potential developed in said cathode impedance is effective to so bias said anode of said diode as to cause said diode to be normally conductive during at least a fraction of the trace period of said saw-tooth current.

3. An electromagnetic beam-deflection system for a television receiver comprising: an electron-discharge apparatus; a load circuit coupled to said apparatus and including an inductor; means coupled to said apparatus for applying thereto a periodic potential for developing a current of saw-tooth wave form in said inductor; a power amplifier stage for translating at least a component of a composite television signal having picture and sound components and including a cathode impedance responsive to the current in said stage for developing a potential across said impedance; and a unidirectionally conductive device having one electrode coupled to said apparatus and said load circuit and another electrode conductively connected to said cathode impedance so that at least a portion of the current flowing in said stage flows through said device and at least a portion of said potential developed in said cathode impedance is effective to so bias said other electrode of said device as to cause said device to be normally conductive during at least a fraction of the trace period of said saw-tooth current.

4. An electromagnetic beam-deflection system for a television receiver comprising: an electron-discharge apparatus; a load circuit coupled to said apparatus and including an inductor; means coupled to said apparatus for applying thereto a periodic potential for developing a current of saw-tooth wave form in said inductor; an audio-frequency amplifier for translating at least the sound component of a composite television signal having picture and sound components and including a cathode impedance responsive to the current in said amplifier for developing a potential across said impedance; and a unidirectionally conductive device having one electrode coupled to said apparatus and said load circuit and another electrode conductively connected to said cathode impedance so that at least a portion of the current flowing in said amplifier flows through said device and at least a portion of said potential developed in said cathode impedance is effective to so bias said other electrode of said device as to cause said device to be normally conductive during at least a fraction of the trace period of said saw-tooth current.

5. An electromagnetic beam-deflection system for a television receiver comprising: a multielectrode vacuum tube having an anode and a cathode; a load circuit coupled to said anode and cathode and including an inductor; a line-scanning generator coupled to one of the electrodes of said tube for applying thereto a periodic potential for developing a current of saw-tooth wave form in said inductor; a signal repeater stage for translating at least a component of a composite television signal having picture and sound components and including a cathode impedance responsive to the current in said stage for developing a potential across said impedance; and a unidirectionally conductive device having one electrode coupled to said anode of said tube and said load circuit and another electrode conductively connected to said cathode impedance so that at least a portion of the current flowing in said stage flows through said device and at least a portion of said potential developed in said cathode impedance is effective to so bias said other electrode of said device as to cause said device to be normally conductive during at least a fraction of the trace period of said saw-tooth current.

6. An electromagnetic beam-deflection system for a television receiver comprising: an electron-discharge apparatus; a load circuit coupled to said apparatus and including an inductor; means coupled to said apparatus for applying thereto a periodic potential for developing a current of saw-tooth wave form in said inductor; a signal repeater stage for translating at least a component of a composite television signal having picture and sound components and including an anode impedance and a cathode impedance responsive to the current in said stage for developing a potential across said cathode impedance, said anode impedance including a focusing winding through which at least a portion of said current in said stage flows so that said winding is effective to stabilize said developed potential; and a unidirectionally conductive device having one electrode coupled to said apparatus and said load circuit and another electrode conductively connected to said cathode impedance so that at least a portion of the current flowing in said stage flows through said device and at least a portion of said potential developed in said cathode impedance is effective to so bias said other electrode of said device as to cause said device to be normally conductive during at least a fraction of the trace period of said saw-tooth current.

7. An electromagnetic beam-deflection system for a television receiver comprising: an electron-discharge apparatus; a load circuit coupled to said apparatus and including an inductor; means coupled to said apparatus for applying thereto a periodic potential for developing a current of saw-tooth wave form in said inductor; an audio-frequency amplifier for translating at least the sound component of a composite television signal having picture and sound components and including a cathode impedance responsive to the current in said amplifier for developing a potential across said impedance; and an efficiency diode having one electrode coupled to said apparatus and said load circuit and another electrode conductively connected to said cathode impedance so that at least a portion of the current flowing in said amplifier flows through said diode and at least a portion of said potential developed in said cathode impedance is effective to so bias said other electrode of said diode as to cause said diode to be normally conductive during at least a fraction of the trace period of said saw-tooth current.

8. An electromagnetic beam-deflection system for a television receiver comprising: a line-frequency amplifier; a load circuit coupled to said amplifier and including a line-frequency deflection winding; a line-frequency generator coupled to said amplifier for applying thereto line-frequency pulses for developing a current of saw-tooth wave form in said deflection winding; a signal repeater stage for translating at least a component of a composite television signal having picture and sound components and including a cathode impedance responsive to the current in said stage for developing a potential across said impedance; and an efficiency diode having one electrode coupled to said amplifier and said load circuit and another electrode conductively connected to said cathode impedance so that at least a portion of the current flowing in said stage flows through said diode and at least a portion of said potential developed in said cathode impedance is effective to so bias said other electrode of said diode as to cause said diode to be normally conductive during at least a fraction of the trace period of said saw-tooth current.

9. An electromagnetic beam-deflection system for a television receiver comprising: a line-frequency output amplifier; a load circuit coupled to said amplifier and including a line-frequency deflection winding; a line-frequency generator coupled to said amplifier for applying thereto line-frequency pulses for developing a current of saw-tooth wave form in said deflection winding; an audio-frequency power amplifier for translating at least the sound component of a composite television signal having picture and sound components and including a cathode impedance responsive to the current in said power amplifier for developing a potential across said impedance; and an efficiency diode having one electrode coupled to said output amplifier and said load circuit and another electrode conductively connected to said cathode impedance so that at least a portion of the current flowing in said power amplifier flows through said diode and at least a portion of said potential developed in said cathode impedance is effective to so bias said other electrode of said diode as to cause said diode to be normally conductive during at least a fraction of the trace period of said saw-tooth current.

References Cited in the file of this patent

UNITED STATES PATENTS

| | | |
|---|---|---|
| 2,470,197 | Torseh | May 17, 1949 |
| 2,482,737 | Shaw | Sept. 20, 1949 |
| 2,555,827 | Tourshou | June 5, 1951 |
| 2,555,831 | Tourshou | June 5, 1951 |
| 2,555,832 | Denton | June 5, 1951 |
| 2,566,432 | Sziklai | Sept. 4, 1951 |

OTHER REFERENCES

General Electric Service Data, "General Electric Television Set Model GE 803."

Rider's Television Manual, volume 2, Zenith Model 28T960.